(12) United States Patent
Cadotte et al.

(10) Patent No.: US 12,304,649 B2
(45) Date of Patent: May 20, 2025

(54) SIMPLEX FLIGHT CONTROL COMPUTER TO BE USED IN A FLIGHT CONTROL SYSTEM

(71) Applicant: THALES CANADA INC., Ottawa (CA)

(72) Inventors: Patrick Cadotte, Québec (CA);
Torsten Liesk, Québec (CA);
Frédérick Clément, Québec (CA)

(73) Assignee: THALES CANADA INC., Ottawa (CA)

(*) Notice: Subject to any disclaimer, the term of this patent is extended or adjusted under 35 U.S.C. 154(b) by 234 days.

(21) Appl. No.: 18/009,094

(22) PCT Filed: Jun. 21, 2021

(86) PCT No.: PCT/IB2021/055452
§ 371 (c)(1),
(2) Date: Dec. 8, 2022

(87) PCT Pub. No.: WO2022/074470
PCT Pub. Date: Apr. 14, 2022

(65) Prior Publication Data
US 2023/0227174 A1    Jul. 20, 2023

Related U.S. Application Data

(60) Provisional application No. 63/089,229, filed on Oct. 8, 2020.

(51) Int. Cl.
*B64D 45/00* (2006.01)
(52) U.S. Cl.
CPC ...... *B64D 45/00* (2013.01); *B64D 2045/0085* (2013.01)

(58) Field of Classification Search
CPC .......... B64D 45/00; B64D 2045/0085; B64D 31/14; G06F 11/0751; G06F 11/1629;
(Continued)

(56) References Cited

U.S. PATENT DOCUMENTS

| 10,423,158 B1 | 9/2019 | Hadlich |
| 2013/0232343 A1* | 9/2013 | Horning ................ G06F 21/125 713/190 |

(Continued)

OTHER PUBLICATIONS

International Search Report and Written Opinion issued in corresponding International Application No. PCT/IB2021/055452, mailed Nov. 2, 2021, pp. 1-10, Canadian Intellectual Property Office, Quebec, Canada.

(Continued)

*Primary Examiner* — Shardul D Patel
(74) *Attorney, Agent, or Firm* — Studebaker Brackett PLLC (57) ABSTRACT

A simplex Flight Control Computer (FCC), usable in conjunction with a neighboring FCC, includes an input providing module for receiving sensor, system and neighboring FCC data; a processing unit for executing a command partition and a monitor partition, the processing unit receives the sensor, system data and neighboring FCC data; the monitor partition monitors the neighboring FCC data and provides a monitoring indicative signal to the neighboring FCC, and the command partition generates command signals; a hardware monitoring module provides a validity signal indicating FCC health; an output cutoff module receiving the FCC validity signal and enable signals generated by each monitor partition; the output cutoff module providing an enable signal based on a predetermined enabling strategy; and an enable switch connected with the output cutoff module and the processing unit and providing (Continued)

a received signal from the command partition according to the enable signal.

8 Claims, 5 Drawing Sheets

(58) Field of Classification Search
CPC ... G06F 11/3013; B64C 13/505; B64C 13/00; B64C 19/00
USPC .......................................................... 701/3
See application file for complete search history.

(56) References Cited

U.S. PATENT DOCUMENTS

| | | |
|---|---|---|
| 2014/0100718 A1 | 4/2014 | Brot et al. |
| 2014/0172203 A1 | 6/2014 | White et al. |
| 2016/0202701 A1 | 7/2016 | Burte |
| 2019/0196927 A1* | 6/2019 | Bosson ............... G06F 11/0796 |
| 2019/0378419 A1 | 12/2019 | Gansmandel et al. |
| 2020/0164965 A1 | 5/2020 | Fervel |

OTHER PUBLICATIONS

Extended European Search Report issued in corresponding European Application No. 21877076.6, dated Sep. 17, 2024, pp. 1-11.

* cited by examiner

SIMPLEX FLIGHT CONTROL COMPUTER TO BE USED IN A FLIGHT CONTROL SYSTEM

CROSS-REFERENCE TO RELATED APPLICATIONS

This application is a U.S. National Phase of International Application No. PCT/IB2021/055452, filed on Jun. 21, 2021, which claims priority of U.S. Patent Application No. 63/089,229 entitled "Simplex flight control computer to be used in a flight control system" that was filed on Oct. 8, 2020.

FIELD

One or more embodiment of the invention relate to Aircraft Flight Control systems (FCS). More precisely, one or more embodiments of the invention pertain to a simplex flight control computer to be used in a flight control system (FCS) comprising the simplex flight control computer and at least one neighboring flight control computer (FCC).

BACKGROUND

Prior art systems for providing flight control commands to operate effector controllers in an aircraft are of great advantage for various reasons. Unfortunately they also suffer from some drawbacks as known to the skilled addressee.

A drawback of prior art systems is that they use dissimilar and/or redundant computers in such a way that the flight control system is robust to faults that may affect certain computers. Some of the computers are used as command and others as monitor. A monitor computer is used for surveillance of the operation and calculation is performed by the command computer. The different computers are then distributed in command and monitor pairs.

For the Vertical Take-Off and Landing (VTOL) Aircrafts and for small aircrafts, there is a need to use a Flight Control System (FCS) meeting the highest safety and availability requirements. Due to the size, weight, power consumption, and sometimes all electric nature of these aircrafts, prior art Flight Control Systems (FCS) are not suitable for these types of aircrafts.

There is a need for a system that will overcome at least one of the above-identified drawbacks.

Features of the invention will be apparent from review of the disclosure, drawings and description of the invention below.

BRIEF SUMMARY

According to a broad aspect, there is disclosed a simplex Flight Control Computer (FCC) to be used in a flight control system comprising the simplex Flight Control Computer and at least one neighboring flight control computer (FCC), the simplex flight control computer comprising an input providing module for receiving sensor data, system data as well as data generated by at least one given neighboring flight control computer of the at least one neighboring flight control computer; a processing unit for executing a command partition and a monitor partition, wherein the processing unit receives the sensor data, the system data and the data generated by each of the at least one given neighboring flight control computer from the input providing module; further wherein the monitor partition is used for monitoring the data generated by each of the at least one given neighboring flight control computer and for providing to each of the at least one neighboring flight control computer a signal indicative of said monitoring, and further wherein the command partition is used for generating command signals; a hardware monitoring module for providing a corresponding Flight Control Computer (FCC) validity signal indicative of a health of the flight control computer; an output cutoff module receiving each corresponding Flight Control Computer (FCC) validity signal from each of the at least one given neighboring flight control computer as well as enable signals generated by each monitor partition of each of the at least one given neighboring flight control computer; the output cutoff module providing an enable signal in accordance with a predetermined enabling strategy; and an enable switch operatively connected to the output cutoff module and to the processing unit and for providing a received signal originating from the command partition according to the enable signal.

In accordance with one or more embodiment, the simplex flight control computer is operatively connected to at least two neighboring flight control computers (FCC), wherein the input providing modules receives sensor data, system data as well as data generated by each of the at least two neighboring flight control computers; further wherein the processing unit receives the sensor data, the system data and the data generated by each of the at least two neighboring flight control computers from the input providing module; further wherein the monitor partition is used for monitoring the data generated by each of the at least two neighboring flight control computers and for providing to each of the at least two neighboring flight control computers a signal indicative of said monitoring; and further wherein the output cutoff module receives each corresponding FCC validity signal from each of the at least two neighboring flight control computers as well as enable signals generated by each monitor partition of each of the at least two neighboring flight control computers.

In accordance with one or more embodiments, the processing unit is a single processing lane with high integrity interlock.

In accordance with one or more embodiments, the simplex Flight Control Computer (FCC) further comprises a power supply module used for powering the simplex Flight Control Computer (FCC).

In accordance with one or more embodiments, said command partition and said monitor partition are coded using a different coding language.

In accordance with one or more embodiments, the predetermined enabling strategy comprises providing a given enable signal to the enable switch to output a corresponding given received signal from the command partition when a validity signal from at least one given neighboring Flight Control Computer (FCC) is received as well as an enable signal by the monitor partition of the at least one given Flight Control Computer (FCC) or when each of the at least one neighboring flight control computer provides an invalid signal.

According to a broad aspect, there is disclosed a Flight Control System (FCS) architecture for an aircraft, the Flight Control System (FCS) architecture comprising a plurality of inceptors and interfacing systems; at least two of the simplex Flight Control Computer (FCC) as disclosed above, each of the at least two simplex Flight Control Computer (FCC) being operatively connected to the plurality of inceptors and interfacing systems and a Backup Flight Control Unit (BFCU) operatively connected to the plurality of inceptors and interfacing systems and to the at least two simplex Flight Control Computers (FCC); and a plurality of Motor Control and Motor Control Units (MC/MCU) used for controlling effectors of the aircraft wherein the plurality of Motor Control and Motor Control Units (MC/MCU) is operatively connected to the at least two simplex Flight Control Computers (FCC) and to the Backup Flight Control Unit (BFCU).

In accordance with one or more embodiments, each of the at least one of plurality of Motor Control and Motor Control Units (MC/MCU) is used for controlling a corresponding effector of the aircraft.

In accordance with one or more embodiments, the plurality of Motor Control and Motor Control Units (MC/MCU) are operatively connected to the at least two simplex Flight Control Computers (FCC) using a first fieldbus and the plurality of Motor Control and Motor Control Units (MC/MCU) are operatively connected to the Backup Flight Control Unit (BFCU) using a second fieldbus and further wherein the first fieldbus is dissimilar to the second fieldbus.

According to one or more embodiments, there is disclosed a Flight Control System (FCS) for VTOL (Vertical Take-Off and Landing) and small aircraft, composed of three simplex Flight Control Computer (FCC) associated with one dissimilar Backup Flight Control Unit (BFCU).

It will be appreciated that simplex implies that the Flight Control Computer (FCC) assembly comprises only one independent and autonomous computer system designed on one or more printed circuit boards including a power supply, a processing module, and its own input and output interface circuitry. As opposed to dual or Duplex Flight Control Computer (FCC) which includes two computer systems, typically arranged as Command and Monitoring cross-checking lanes.

It will be appreciated by the skilled addressee that the Flight Control System (FCS) is the interface between the provider of piloting cues (e.g., single pilot operation, or full autonomy system), and the various effectors moving the flight surfaces and driving the propellers of the aircraft.

It will be appreciated that the disclosed architecture is based on proven air transport and business jet technologies. It meets the industry safety requirements and ensures the Flight Control System (FCS) high integrity by implementing a consolidation of all Flight Control Computer (FCC) lanes through a voting mechanism. A Backup Flight Control Unit (BFCU), dissimilar from the Flight Control Computer (FCC) in terms of hardware and software, enforces the Flight Control System (FCS) high availability by providing a common mode mitigation to the loss of all Flight Control Computer (FCC).

In accordance with one or more embodiments, the Flight Control Computer (FCC) embeds functions, such as localization and motion determination, trajectories management, trajectory protection, trajectory execution, flight controls commands computation, flight and ground crew alerting function, and autonomy and decision functions execution; many of them being critical.

In accordance with one or more embodiments, the Flight Control Computer (FCC) comprises an input providing module and an output providing module for acquisition from different aircraft sensors and system, and for transmission to other aircraft systems and to effector controllers, a processing module, a power supply module, and hardware monitoring module.

In accordance with one or more embodiments, the input providing module and the output providing module are designed as versatile, such that each of them can be connected to different sensor types for the measurement of position, speed, and current data.

In accordance with one or more embodiments, each Flight Control Computer (FCC) is a multi-applications platform, and on each Flight Control Computer (FCC) a command partition and a monitor partition are executed.

In accordance with one or more embodiments, for safety reasons, different coding languages are used for the command partition and for the monitor partition. For example C code may be used for the command partition and the ADA code for the monitor partition.

In accordance with one or more embodiments, the command partition computes commands for transmission to effectors controller and to adjacent Flight control Computers (FCC). The monitor partition computes command estimates for cross-FCC comparisons.

In accordance with one or more embodiments, each Flight Control Computer (FCC) receives enable flags and validity discretes from the adjacent Flight Control Computers (FCC)s. These signals are used to enable the Flight Control Computer (FCC) critical outputs for command transmission to the effector controllers. In each Flight Control Computer (FCC), the monitor partition checks the integrity of the command partition computation of the adjacent Flight Control Computers (FCC) and generates the enable flags.

In accordance with one or more embodiments, a Flight Control Computer (FCC) transmits commands on a critical output if at least one valid adjacent Flight Control Computer (FCC) sets the corresponding output enable flag. On the other hand, the critical outputs are muted if all the valid adjacent Flight Control Computers (FCC) do not set their output enable flag, i.e., all valid adjacent Flight Control Computer (FCC) agree on muting the critical output.

In accordance with one or more embodiments, the Flight Control Computer (FCC) also has the option to let the last valid Flight Control Computer (FCC) transmitting commands, unmonitored, upon loss of validity from all adjacent Flight Control Computers (FCC).

In accordance with one or more embodiments, the validity of Flight Control Computer (FCC) platform is assessed by internal monitoring principle, such as in-line hardware and software self-checking monitors.

In accordance with one or more embodiments, the Backup Flight Control Unit (BFCU) is a simplex processing lane and is designed for pressurized and temperature controlled environment.

In accordance with one or more embodiments, the Backup Flight Control Unit (BFCU) is dissimilar from the Flight Control Computer (FCC). This includes computer hardware and software, and communication buses to actuation and propulsion controllers.

In accordance with one or more embodiments, the Backup Flight Control Unit (BFCU) comprises a processor component. The system architecture disclosed herein is designed for VTOL vehicles which are unstable, or with multiple different shapes, and thus require stability augmentation at all times.

In accordance with a broad aspect, the Flight Control System (FCS) architecture disclosed herein includes the main failure mitigation means ensuring the system integrity and availability. The Flight Control Computer (FCC) monitoring by independent adjacent Flight Control Computers (FCC) maintains the system integrity in the face of random hardware failures. The system availability is proportional to the number of redundant adjacent Flight Control Computers (FCC). In case of systematic hardware failures, the integrity is ensured by the in-line Hardware monitors, while the system availability is guaranteed by the Flight Control Computer (FCC) and the Backup Flight Control Unit (BFCU) dissimilarity. In case of systematic software fault, the dissimilar command and monitor application software, and the in-line core software monitors ensure the system integrity. The system availability is guaranteed by the Flight Control Computer (FCC) and Backup Flight Control Unit (BFCU) Software dissimilarity.

It will be appreciated that the simplex Flight Control Computer (FCC) disclosed herein and the corresponding Flight Control System (FCS) architecture are of great advantage for various reasons.

For instance, a first advantage of one or more embodiments of the simplex Flight Control Computer (FCC) disclosed herein and the corresponding Flight Control System (FCS) architecture is that they reduce the Size, Weight and Power (SWaP) at the aircraft level compared to prior art Flight Control System (FCS) architectures because every Flight Control Computer (FCC) lane acts both as command and as monitor as opposed to being implemented on separate hardware as with the prior art.

A second advantage of one or more embodiments of the simplex Flight Control Computer (FCC) disclosed herein and the corresponding Flight Control System (FCS) architecture is that they offer a scalable solution in terms of number of Flight Control Computer (FCC) to be used and if the Backup Flight Control Unit (BFCU) is used or not. This enables adapting the system to different safety requirements by changing the number of units in the system. It also enables adapting to vehicles with a large number of effectors by increasing the number of Flight Control System (FCS) units, as required.

A third advantage of one or more embodiments of the simplex Flight Control Computer (FCC) disclosed herein and the corresponding Flight Control System (FCS) architecture is that they enable implementing at the aircraft level Simplex Motor Control and Motor Control Unit for actuation and propulsion control. The Flight Control Computer (FCC) and the Backup Flight Control Unit (BFCU) control laws generate actuation position, propeller speed, or torque commands, while the servo-loops are implemented in the Motor Controller/Motor Control Unit (MC/MCU). Independent position, speed, and current sensors acquired by the Flight Control System (FCS) ensure the monitoring of the Motor Controller/Motor Control Unit (MC/MCU) control. It will be appreciated by the skilled addressee that the DAL A development of the Flight Control System (FCS) ensures integrity of the monitoring. It will also be appreciated by the skilled addressee that simpler Motor Controller/Motor Control Unit (MC/MCU) ease the capability for an aircraft manufacturer to develop or procure dissimilar Motor Controller/Motor Control Unit (MC/MCU) controller, if desired.

A fourth advantage of one or more embodiments of the simplex Flight Control Computer (FCC) disclosed herein and the corresponding Flight Control System (FCS) architecture is the versatility of the FCC analog interfaces, which gives the capacity to implement the disclosed architecture on multiple Aircraft platforms without modification of the Flight Control Computer (FCC) and the Backup Flight Control Unit (BFCU) hardware platforms.

A fifth advantage of one or more embodiments of the simplex Flight Control Computer (FCC) disclosed herein and the corresponding Flight Control System (FCS) architecture is the ability of the Flight Control Computer (FCC) to host different partitions which enables including autonomy and protection functions into the system without additional hardware and without affecting the design of the flight control functions.

BRIEF DESCRIPTION OF THE DRAWINGS

In order that one or more embodiments of the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which one or more embodiments of the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. One of ordinary skill in the art will recognize that one or more embodiments of the disclosed invention(s) may be practiced with various modifications and alterations, such as structural and logical modifications. Although particular features of one of more embodiments of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention are directed to a simplex Flight Control Computer (FCC), a Flight Control System (FCS) architecture comprising a simplex Flight Control Computer (FCC) and a dissimilar Backup Flight Control Unit (BFCU).

Figure 1:
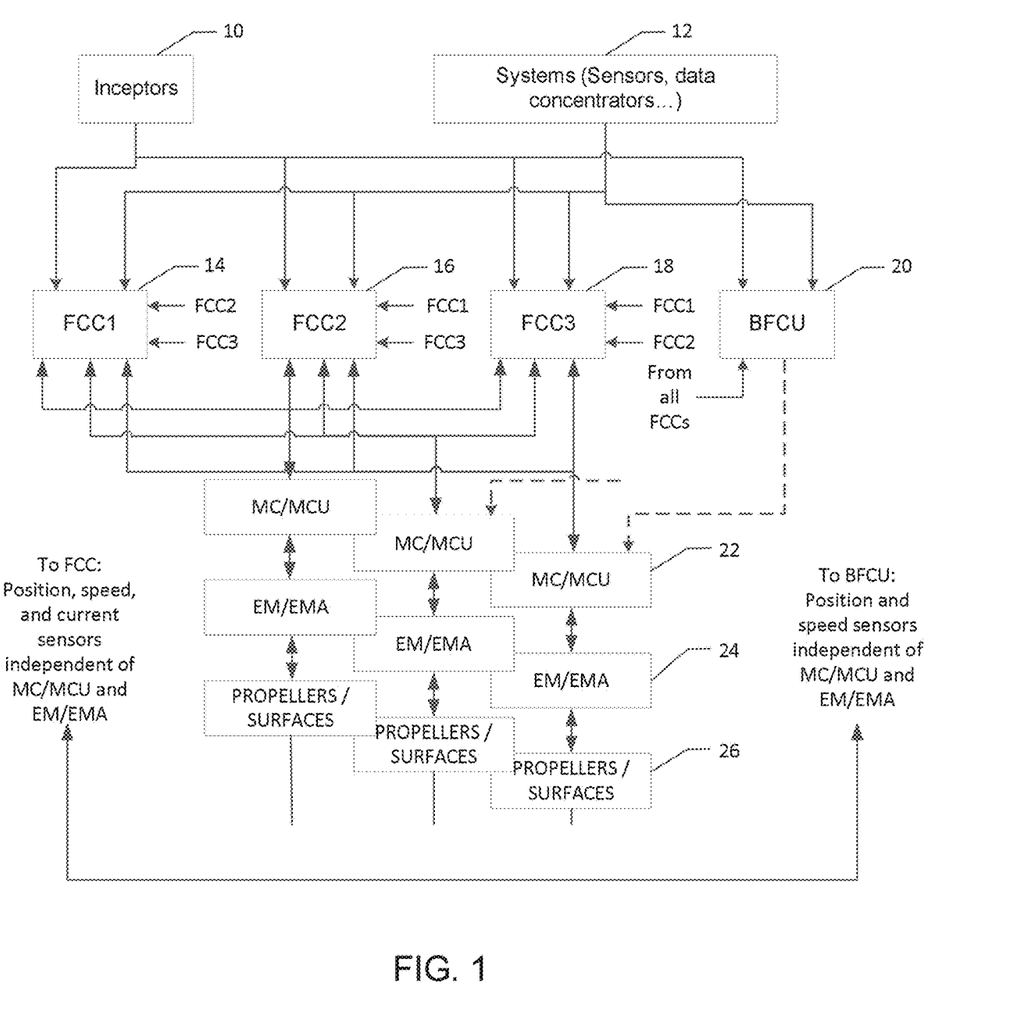
FIG. 1 is a diagram which shows an embodiment of a Flight Control System (FCS) architecture controlling actuators and propeller of an aircraft.

Now referring to FIG. 1, there is shown an embodiment of a Flight Control System (FCS) architecture for controlling surface actuators and propeller motors of an aircraft.

In this embodiment, the Flight Control System (FCS) architecture comprises inceptors 10 and interfacing systems 12. The inceptors 10 and the interfacing systems 12 are inputs to Flight Control Computers (FCCs) 14, 16 and 18 and to a Backup Flight Control Unit (BFCU) 20. Control laws are used for the computation of the surface position, propeller speed, or torque commands.

It will be appreciated by the skilled addressee that the interfacing systems 12 may group all the aircraft systems needed by the Flight Control System (FCS), such as sensors or data concentrators.

It will be appreciated that in the embodiment disclosed in FIG. 1, the architecture disclosed herein further comprises the three Flight Control Computers (FCC) 14, 16 and 18 and the Backup Flight Control Unit (BFCU) 20. The Flight Control Computers (FCC) 14, 16 and 18 and the Backup Flight Control Unit (BFCU) 20 are directly interfacing with the inceptors 10, and the interfacing systems 12. The Flight Control Computers (FCC) 14, 16 and 18 are also operatively interconnected for monitoring and enabling purpose as further explained below. It will be further appreciated that the Flight Control Computers (FCC) 14, 16 and 18 are also operatively connected to the Backup Flight Control Unit (BFCU) 20.

The Flight Control System (FCS) architecture further comprises Motor Control and Motor Control Units (MC/MCU) 22. The various Motor Control and Motor Control Units (MC/MCU) 22 are controlling the various aircraft effectors, i.e., surface actuators and propeller motors. The Motor Control and Motor Control Units 22 are operatively connected to the Flight Control Computers (FCC) 14, 16 and 18 and to the Backup Flight Control Unit (BFCU) 20 which provide them with their computed commands.

It will be appreciated that the field buses used by the Flight Control Computers (FCC) 14, 16 and 18 for communicating with the Motor Control and Motor Control Units (MC/MCU) 22 are dissimilar with the field bus used by the Backup Flight Control Unit (BFCU) 20 to communicate with the Motor Control and Motor Control Units (MC/MCU) 22.

The Motor Control and Motor Control Units (MC/MCU) 22 perform a servo-control of the Electric Motors and Electro-Mechanical Actuators (EM/EMA) 24, respectively. In turn, the Electric Motors and Electro-Mechanical Actuators (EM/EMA) 24 drive and actuate the aircraft propellers and surfaces 26, respectively.

The Flight Control Computers (FCC) 14, 16 and 18, and the Backup Flight Control Unit (BFCU) 20 are also connected directly to speed, position, and current sensors independent of the Motor Control and Motor Control Units (MC/MCU) 22 and the Electric Motors and Electro-Mechanical Actuators (EM/EMA) 24 to ensure a proper and independent monitoring of the actuation and propulsion assemblies.

It will be appreciated that the architecture described by FIG. 1 is an embodiment of a possible architecture which may be implemented using one or more embodiments of the simplex Flight Control Computer disclosed herein.

In an alternative embodiment, the architecture comprises two Flight Control Computers (FCC) and a Backup Flight Control Unit (BFCU).

Figure 2:
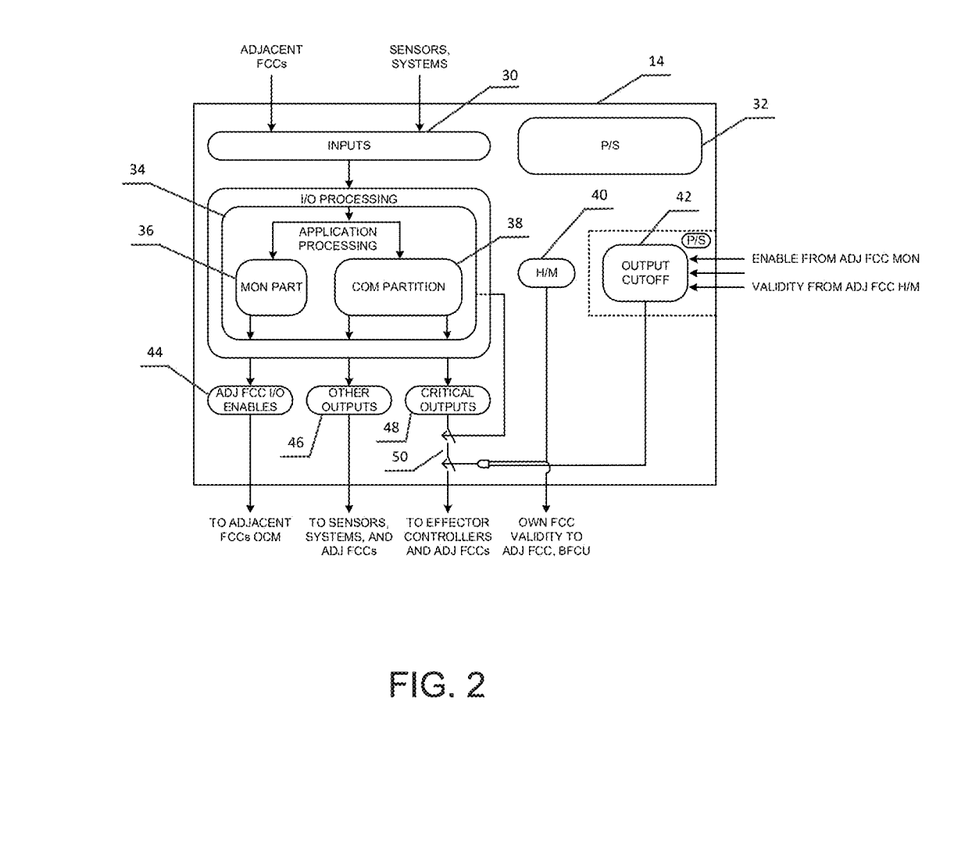
FIG. 2 is a diagram which shows the internal block diagram defined for an embodiment of the simplex Flight Control Computer (FCC).

Now referring to FIG. 2, there is shown an embodiment of a simplex Flight Control Computer (FCC) 14.

It will be appreciated that the simplex Flight Control Computer (FCC) 14 is used in a Flight Control System (FCS) comprising the simplex Flight Control Computer (FCC) 14 and at least one neighboring flight control computer (FCC). In this particular embodiment, the at least one neighboring flight control computer (FCC) comprises neighboring flight control computer (FCC) 16 and 18. In one or more alternative embodiments, the Flight Control System (FCS) comprises the simplex Flight Control Computer (FCC) 14 and at least two neighboring flight control computers (FCC).

More precisely, the simplex Flight Control Computer (FCC) 14 comprises an input providing module 30 for receiving sensor data, system data as well as data generated by at least one given neighboring flight control computer of the at least one neighboring Flight Control Computer (FCC). In fact, it will be appreciated that the input providing module 30 may be used for acquiring and digitizing data in order to make them available to a processing unit 34, as further explained below. It will be appreciated by the skilled addressee that the input of the input providing module 30 may be of various types, such as for instance signals originating from digital communication buses, discrete signals and analog signals. For instance and in one or more non-limiting embodiments, the digital buses are selected from a group consisting of A429 digital bus, RS-485, CAN field bus and Ethernet. The skilled addressee will appreciate that various alternative embodiments may be provided for the input of the input providing module 30. It will be further appreciated that analog inputs are versatile such that each input can be connected to a different sensor type. In one or more embodiments, the sensor is selected from a group consisting of, but not limited to, a resolver, a Variable Differential Transformer (VDT), a tachymeter, a Hall effect sensor and a variable reluctance sensor.

The simplex Flight Control Computer (FCC) 14 further comprises a processing unit 34 for executing a command partition 38 and a monitor partition 36. It will be appreciated that the processing unit 34 receives the sensor data, the system data and the data generated by each of the at least one given neighboring flight control computer (FCC) from the input providing module 30. It will be further appreciated that the monitor partition 36 is used for monitoring the data generated by each of the at least one given neighboring flight control computer (FCC) and for providing to each of the at least one given neighboring flight control computer (FCC) a signal indicative of said monitoring. The command partition 38 is used for generating commands signals. The skilled addressee will appreciate that the monitoring of the data generated by each of the at least one neighboring flight control computer may be performed according to various embodiments.

In fact, it will be appreciated that in one or more embodiments, the processing unit 34, also referred to as an Application Processing Module 34 is developed as a multi-applications platform accordingly to the norm DO-297 and embeds the command partition 38 and the monitor partition 36. The Application Processing Module 34 receives the data from the input providing module 30, and makes them available for the different partitions 36 and 38. It will be appreciated by the skilled addressee that the two partitions 36 and 38 described here are in no way limiting. As a matter of fact, it will be appreciated by the skilled addressee that the processing unit 34 may host more than two partitions with various functionalities.

It will be further appreciated that that the Application Processing Module 34 also performs in-line core software monitoring to ensure the health and validity of the multi-application platform. For example, time violation failures are monitored by a program watchdog to detect a potential staled or drifting clock, and by a partitions watchdog to detect potential incorrectly scheduled partitions or partially executed partitions. The results of these monitors are provided to the hardware monitoring module 40.

In the embodiment disclosed, the command partition 38 is one of the partitions included in the Application Processing Module 34. Based on the data provided by the input providing module 30, the command partition 38 computes various functions generating the flight controls commands. The skilled addressee will appreciate that the computing of the various functions generating the flight control commands may be performed according to various embodiments known to the skilled addressee.

In the embodiment disclosed, the other partition included in the Application Processing Module 34, is the monitor partition 36. In one or more embodiments, both, the command partition 38 and the monitor partition 36 follow DAL A development with two different coding languages, e.g. C for the command partition 38 and ADA for the monitor partition 36. The skilled addressee will appreciate that various alternative embodiments may be possible.

It will be appreciated by the skilled addressee that the coding languages used to develop the command partition 38 and the monitoring partition 36 meet the dissimilarity requirement.

Based on the data provided by the input providing module 30 from the aircraft sensors and systems, and from the adjacent Flight Control Computers (FCC) 16 and 18, the monitor partition 36 performs the monitoring of the adjacent Flight Control Computers (FCC) 16 and 18 critical outputs by cross-Flight Control Computers (FCC) comparisons and determines the enable flags to be sent to the adjacent Flight Control Computers (FCC).

The simplex Flight Control Computer (FCC) 14 further comprises a hardware monitoring module 40 for providing a corresponding FCC validity signal indicative of a health of the simplex Flight Control Computer (FCC) 14.

More precisely, the hardware monitoring module 40, also referred to as a Heath and Monitoring Module 40, computes the own FCC validity signal to be sent to the adjacent Flight Control Computer (FCC) (and Backup Flight Control Computer (BFCU)). It will be appreciated that the validity signal is based on the consolidation of the various monitors implemented to ensure the health of the Flight Control Computer (FCC). In one or more embodiment, this includes the in-line hardware monitors and the in-line core software monitors to detect and passivate systematic failure modes impacting the Flight Control Computer (FCC). The skilled addressee will appreciate that various embodiments are possible for the hardware monitoring module 40 and that the design of such module is known to the skilled addressee.

The simplex Flight Control Computer (FCC) 14 further comprises a power supply module 32. In one or more embodiments, the power supply module 32 receives two different 28 Vdc power inputs from the aircraft. From these inputs, secondary voltages are generated to power the Flight Control Computer (FCC) 14 internal components. It will be appreciated by the skilled addressee that a continuous monitoring of the healthy behavior of the power supply module 32 is performed, and a corresponding healthy signal is provided to the hardware monitoring module 40 in one or more embodiments. The skilled addressee will appreciate that various embodiments are possible for the power supply module 32 and that the design of such module is known to the skilled addressee.

The simplex Flight Control Computer (FCC) 14 further comprises an output cutoff module 42 receiving each corresponding FCC validity signal from each of the at least one adjacent Flight Control Computer (FCC), as well as enable flags generate by each monitor partition of each of the at least one adjacent Flight Control Computer (FCC). The output cutoff module 42 provides an enable signal in accordance with a predetermined enabling strategy. It will be appreciated by the skilled addressee that the predetermined enabling strategy may be of various types as further explained below.

The simplex Flight Control Computer (FCC) further comprises output modules, separated, in one or more embodiments, into critical outputs 48, adjacent FCCs I/O enable outputs 44 and other outputs 46.

The adjacent FCCs I/O enable outputs 44 are based on the monitoring partition 36 monitors results. The signals are provided to the output cutoff module 42 of the adjacent Flight Control Computers (FCC) 16 and 18.

In one or more embodiments, digital buses RS-485 and CAN field bus to the effector controllers are part of the critical outputs 48. On these buses, control commands computed by the command partition 38 are sent to the various Motor Controllers and Motor Control Units 22. In one or more embodiments, the critical outputs 48 also include the ARINC 429 buses used for system status reporting and possibly for backup control of the effectors.

The other outputs 46 regroups all the other transmissions, for example versatile analog outputs used for sensors excitations and discrete outputs such as effector controller enables and own Flight Control Computer (FCC) validity.

The simplex Flight Control Computer (FCC) 14 further comprises an enable switch 50 operatively connected to the output cutoff module 42 and to the processing unit 34 and for providing a received signal originating from the command partition 38 according to the enable signal.

In fact, the output cutoff module 42 is defined to control the enable switch 50 used to enable the critical outputs 48. In one or more embodiments, the output cutoff module 42 uses enable flags and validity signals from the adjacent Flight Control Computers (FCC) 16 and 18.

It will be appreciated that the output cutoff module 42 and the critical output 48 can be seen as being a part of a critical output providing unit. The purpose of such critical output providing unit is to provide a received signal originating from the command partition according to the enable signal provided by the output cutoff module 42.

Figure 3:
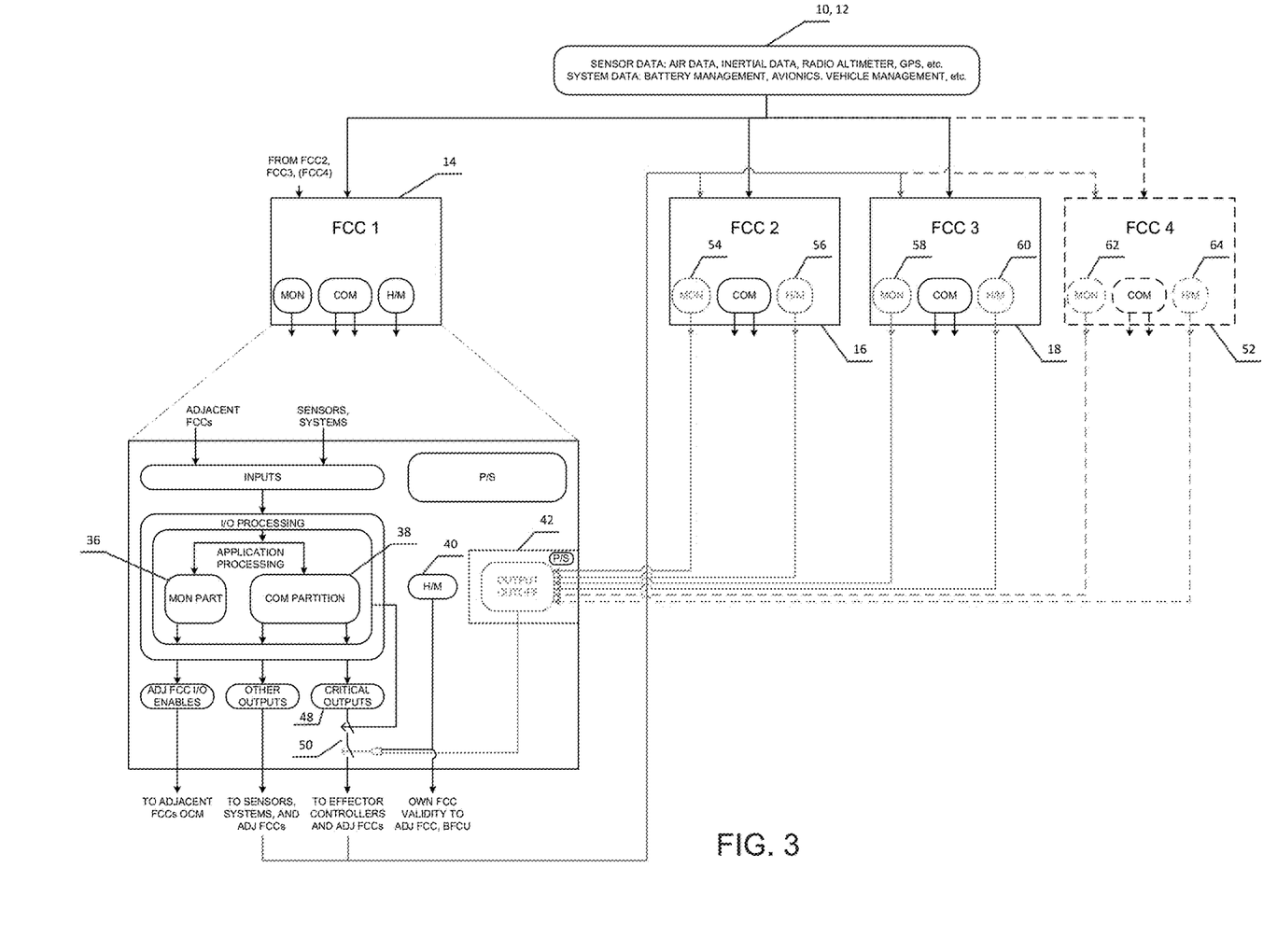
FIG. 3 is a diagram which shows, inter alia, an embodiment of the simplex Flight Control Computer (FCC) output cutoff module enable mechanism.

Now referring to FIG. 3, there is shown, inter alia, an embodiment of the output cutoff module 42 enable mechanism.

In the embodiment disclosed, in each Flight Control Computer (FCC) 14, 16, 18 and potentially 52, the monitor partitions 36, 54, 58 and 62 compute enable flags for the adjacent Flight Control Computers (FCC), based on cross-FCC commands comparisons. Also, in each Flight Control Computer (FCC) 14, 16, 18 and 52, the hardware monitoring modules 40, 56, 60 and 64 determine the own Flight Control Computer (FCC) validity that are provided to all the adjacent Flight Control Computers (FCC).

In the embodiment disclosed, the output cutoff module 42 determines the enable condition for the critical outputs 48. It will be appreciated that the output cutoff module 42 determines the enable condition for the critical outputs 48 using each received corresponding Flight Control Computer (FCC) validity signal from each of the at least one given neighboring flight control computer as well as enable signals generated by each monitor partition of each of the at least one given neighboring flight control computer. It will be further appreciated that the enable signal is provided in accordance with a predetermined enabling strategy. In the output cutoff module 42 and in accordance with one or more embodiments, one discrete output enable is generated per critical output.

As mentioned previously, it will be appreciated that the predetermined enabling strategy of the output cutoff module may be of various types. In fact and in one or more embodiments, a possible truth table to be configured in the output cutoff module 42 is to consider that one specific critical output 48 is enabled when at least one adjacent Flight Control Computer (FCC) is valid and its corresponding output enable flag is set to enable or when all adjacent Flight Control Computers (FCC) set their own validity signal to not valid. The skilled addressee will appreciate that various alternative embodiments may be possible for the predetermined enabling strategy.

It will be appreciated that the logic used for determining the enable condition implemented in the output cutoff module 42 may also be defined by an aircraft manufacturer depending on various considerations.

It will be appreciated that in the embodiment disclosed, for each critical output 48, the enable switch 50 is driven by the output cutoff module 42, based on the validity signal and enable flags from the adjacent Flight Control Computers (FCC), and by the own Flight Control Computer (FCC) partitions 36 and 38, based on internal engagement logic.

Figure 4:
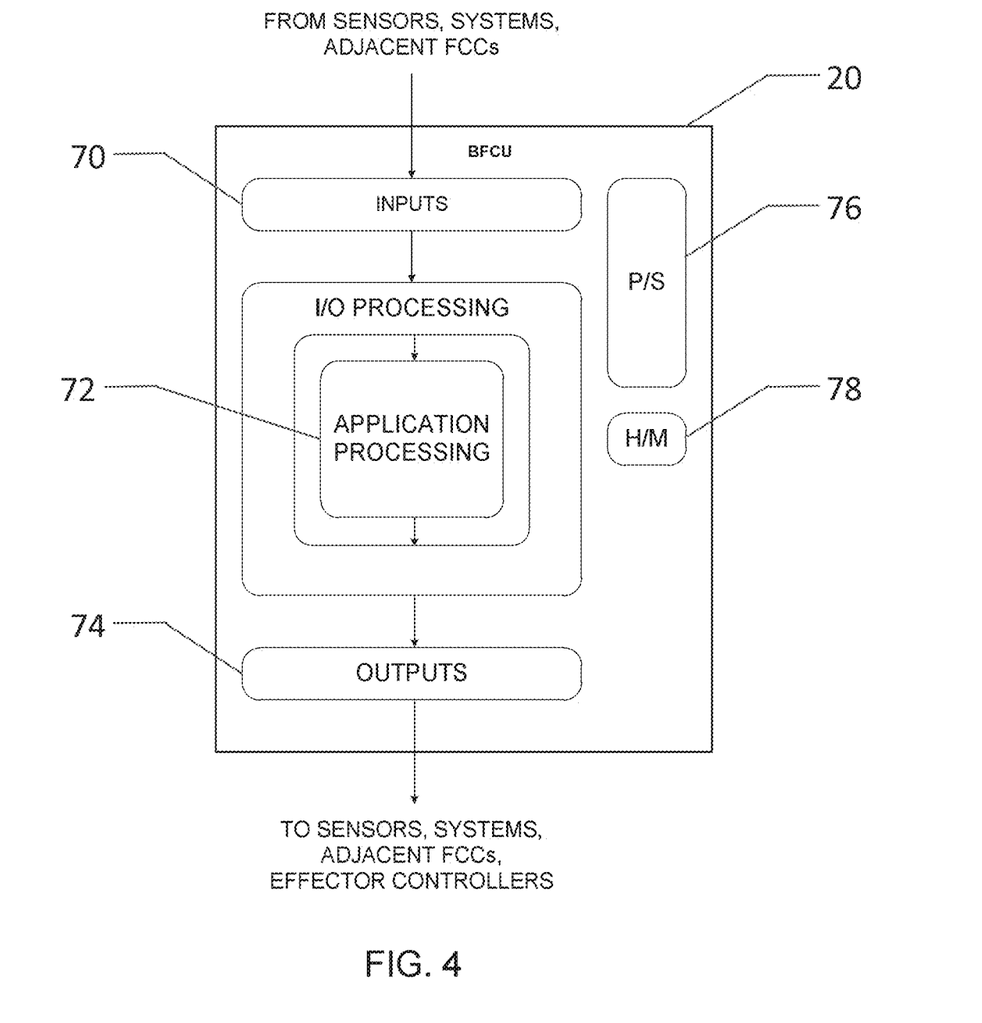
FIG. 4 is a diagram which shows an internal block diagram defined for an embodiment of the Backup Flight Control Unit (BFCU).

Now referring to FIG. 4, there is shown an embodiment of a Backup Flight Control Unit (BFCU).

In the embodiment disclosed, the Backup Flight Control Unit (BFCU) 20 comprises a simplex processing lane and follows at least the DAL B development assurance level.

It will be appreciated by the skilled addressee that the hardware and the software components of the Backup Flight Control Unit (BFCU) 20 are dissimilar to the Flight Control Computer (FCC) components.

In this embodiment, the Backup Flight Control Unit (BFCU) 20 receives data from the adjacent Flight Control Computers (FCC) 14, 16 and 18, and from the sensors 10 and systems 12.

These signals and data are processed by an input providing module 70. The input providing module 70 is used for acquiring and digitizing data and for providing them to an application processing module 72. It will be appreciated that the application processing module 72 is implemented on a processing unit.

It will be further appreciated that the application processing module 72 is used for computing a set of control laws. The application processing module 72 computes the commands to actuators and propellers needed to operate the aircraft. The outputs of the control laws are provided to an output module 74.

It will be appreciated by the skilled addressee, that the processor unit is required for the Application Processing Module 72, as the purpose of the embodiment is to be scalable to different aircrafts, such as Vertical Take-Off and Landing (VTOL) aircrafts. These Vertical Take-Off and Landing (VTOL) aircrafts can be unstable, and require control laws with full time stability augmentation.

The Backup Flight Control Unit (BFCU) 20 further comprises a power supply module 76. The power supply module 76 receives, in one or more embodiments, 28 Vdc power input from the aircraft. From this input, secondary voltages are generated to power the internal components of the Backup Flight Control Unit (BFCU) 20. It will be appreciated by the skilled addressee that a continuous monitoring of the healthy behavior of the power supply module 76 is performed, and a corresponding healthy signal is provided to a hardware monitoring module 78, which is also referred to as a health and monitoring module. The hardware monitoring module 78 is located in the Backup Flight Control Unit (BFCU) 20. The skilled addressee will appreciate that various embodiments may be provided for the power supply module 76.

The Backup Flight Control Unit (BFCU) 20 further comprises a hardware monitoring module, also referred to as the health and monitoring module 78. In the embodiment disclosed, the logic implemented in the hardware monitoring module 78 is used mostly for reporting as to minimize the likelihood of a Backup Flight Control Unit (BFCU) shutdown, effectively maximizing its availability. It will be appreciated that a Backup Flight Control Unit (BFCU) verification is performed by the Flight Control Computers (FCC) 14, 16 and 18 level to uncover dormancies. The skilled addressee will appreciate that various embodiments may be provided for the hardware monitoring module 78.

The Backup Flight Control Unit (BFCU) 20 further comprises an output module 74. In this embodiment, the output module 74 transmits to the aircraft systems, the adjacent Flight Control Computers (FCC) and the effector controllers the results of the Application Processing Module 72. The output module 74 transmits to the adjacent Flight Control Computers (FCC) the validity discrete provided by the hardware monitoring module 78. The skilled addressee will appreciate that various embodiments may be provided for the output module 74.

Figure 5:
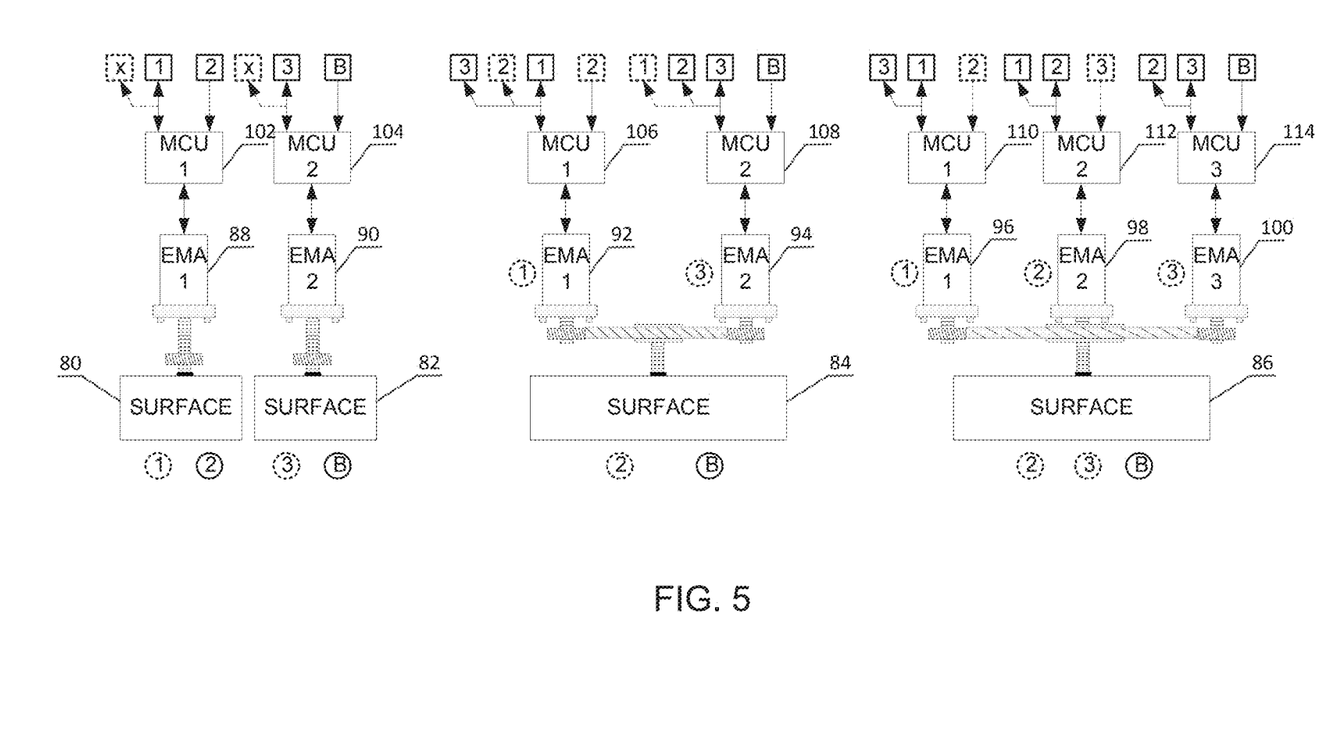
FIG. 5 is a diagram which illustrates various embodiments in which the simplex Flight Control System (FCS) is used for actuator control.

Now referring to FIG. 5, there are shown various examples in which one or more embodiments of the Flight Control System (FCS) disclosed herein is used for actuation control. It will be appreciated by the skilled addressee that these examples extend straightforwardly to propulsion control schemes.

More precisely and referring to FIG. 5, three examples of possible actuation control schemes are given to illustrate one or more embodiments of the architecture disclosed herein.

In a first embodiment, each aircraft surface 80 and 82 is controlled by its own actuator 88 and 90 and its associated Motor Control Unit (MCU) 102 and 104.

In this embodiment, the first Motor Control Unit (MCU) is connected to the Flight Control System (FCS) on its primary bus to the Flight Control Computer (FCC) 14. It will be appreciated that this connection is a bi-directional connection that enables the Motor Control Unit (MCU) 102 to receive commands and statuses from the Flight Control Computer (FCC) 14, and to provide to the Flight Control Computer (FCC) 14 its feedback and potential reporting information.

It will be appreciated that the primary communication bus can be also connected to another Flight Control Computer (FCC) to increase the redundancy and the availability of the communication.

In this embodiment, a secondary communication bus of the Motor Control Unit (MCU) 102 can be connected to another Flight Control Computer (FCC), for example to the Flight Control Computer (FCC) 16. In this particular embodiment, the secondary bus of the Motor Control Unit (MCU) 102 is an unidirectional bus from the Flight Control Computer (FCC) 16 only.

In the same way, the second Motor Control Unit (MCU) 104 is connected on its primary bus to the Flight Control Computer (FCC) 18, and potentially to another Flight Control Computer (FCC), and on its secondary bus to the Backup Flight Control Unit (BFCU) 20. For integrity reasons, the Backup Flight Control Unit (BFCU) command is ignored when valid commands from the Flight Control Computer (FCC) 18 or any other Flight Control Computer (FCC) are available on the second Motor Control Unit (MCU) 104 bidirectional bus.

It will be appreciated by the skilled addressee that in this embodiment, the runaway of one surface is not categorized as a catastrophic failure.

In a second embodiment, the aircraft surface 84 is driven by two actuators 92 and 94, with their own associated Motor Control Units (MCU) 106 and 108.

It will be appreciated that in this configuration, the actuators can be driven in Active—Active or Active—Standby configurations. In the former case, independent current sensors are added for the detection and isolation of possible EMA1 92 or EMA2 94 runaway.

In the embodiment disclosed, the Motor Control Units (MCU) 106 and 108 can be connected to the three Flight Control Computers (FCC) 14, 16 and 18 by a bi-directional communication bus. With this configuration, an engagement logic is needed in the Flight Control Computer (FCC) to define the transmission priority.

In the embodiment disclosed, one of the Motor Control Units (MCU), in this case the Motor Control Unit (MCU) 108 is also connected to the Backup Flight Control Unit (BFCU) 20 with a communication bus to receive its commands. For integrity reasons, the Backup Flight Control Unit (BFCU) command is ignored when valid commands from the Flight Control Computer (FCC) 18 or any other Flight Control Computer (FCC) are available on the second Motor Control Unit (MCU) 108 bus.

In a third example, the aircraft surface 86 is driven by three actuators 96, 98 and 100, with their own associated Motor Control Unit (MCU) 110, 112 and 114.

It will be appreciated that in this configuration, the actuators can be driven in Active—Active—Active or Active—Standby—Standby configurations. In the former case, independent current sensors are added for the detection and isolation of possible EMA1 96, EMA2 98, or EMA3 100 runaway.

In this embodiment, a first Motor Control Unit (MCU) 110 can be connected to the Flight Control System (FCS) on its primary bus to the Flight Control Computer (FCC) 14 and to the Flight Control Computer (FCC) 18. This connection is a bi-directional connection that enables the Motor Control Unit (MCU) 110 to receive commands and statuses from the Flight Control Computer (FCC) 14 or the Flight Control Computer (FCC) 18, and to provide them with its feedback and potential reporting information.

In this embodiment, the second Motor Control Unit (MCU) 112 can be connected to the Flight Control System (FCS) on its primary bus to the Flight Control Computer (FCC) 16 and to the Flight Control Computer (FCC) 14. This connection is a bi-directional connection that enables the Motor Control Unit (MCU) 112 to receive commands and statuses from the Flight Control Computer (FCC) 16 and the Flight Control Computer (FCC) 14, and to provide them with its feedback and potential reporting information.

The third Motor Control Unit (MCU) 114 can be connected to the Flight Control System on its primary bus to the Flight Control Computer (FCC) 18 and the Flight Control Computer (FCC) 16. This connection is a bi-directional connection that allows the Motor Control Unit 112 to receive commands and statuses from the Flight Control Computer (FCC) 16 and the Flight Control Computer (FCC) 14, and to provide them with its feedback and potential reporting information. Also, in this embodiment, the third Motor Control Unit (MCU) 114 is connected to the Backup Flight Control Unit (BFCU) 20 on a secondary bus. For integrity reasons, the Backup Flight Control Unit (BFCU) command is ignored when valid commands from the Flight Control Computer (FCC) 18 or the Flight Control Computer (FCC) 16 are available on the third Motor Control Unit (MCU) 114 bi-directional bus.

With this configuration, engagement logic is needed in the Flight Control Computer (FCC) to define the transmission priority on the bi-directional buses.

It will be also appreciated by skilled addressee, that to increase the availability of the system, the two first Motor Control Units (MCU) 110 and 112 can potentially be connected on a secondary bus to an available Flight Control Computer (FCC). In the embodiment disclosed, the Motor Control Unit (MCU) 110 could be connected to the Flight Control Computer (FCC) 16, and the Motor Control Unit (MCU) 112 to the Flight Control Computer (FCC) 18.

It will be appreciated by the skilled addressee that the simplex Flight Control Computer (FCC) disclosed herein and the corresponding Flight Control System (FCS) architecture are of great advantage for various reasons.

For instance, a first advantage of the simplex Flight Control Computer (FCC) disclosed herein and the corresponding Flight Control System (FCS) architecture is that they reduce the Size, Weight and Power (SWaP) at the aircraft level compared to prior art Flight Control System (FCS) architectures because every Flight Control Computer (FCC) lane acts both as Command and as Monitor as opposed to being implemented on separate hardware as with the prior art.

A second advantage of the simplex Flight Control Computer (FCC) disclosed herein and the corresponding Flight Control System (FCS) architecture is that they offer a scalable solution in terms of number of Flight Control Computer (FCC) to be used and if the Backup Flight Control Unit (BFCU) is used or not. This enables adapting the system to different safety requirements by changing the number of units in the system. It also enables adapting to vehicles with a large number of effectors by increasing the number of Flight Control System (FCS) units, as required.

A third advantage of the simplex Flight Control Computer (FCC) disclosed herein and the corresponding Flight Control System (FCS) architecture is that they enable implementing at the aircraft level Simplex Motor Control and Motor Control Unit for actuation and propulsion control. The Flight Control Computer (FCC) and Backup Flight Control Unit (BFCU) control laws generate actuation position, propeller speed, or torque commands, while the servo-loops are implemented in the Motor Controller/Motor Control Unit (MC/MCU). Independent position, speed, and current sensors acquired by the Flight Control System (FCS) ensure the monitoring of the Motor Controller/Motor Control Unit (MC/MCU) control. It will be appreciated by the skilled addressee that the DAL A development of the Flight Control System (FCS) ensure integrity of the monitoring. It will be also appreciated by the skilled addressee that simpler Motor Controller/Motor Control Unit (MC/MCU) ease the capability for an aircraft manufacturer to develop or procure dissimilar Motor Controller/Motor Control Unit (MC/MCU) controller, if desired.

A fourth advantage of the simplex Flight Control Computer (FCC) disclosed herein and the corresponding Flight Control System (FCS) architecture is the versatility of the FCC analog interfaces, which gives the capacity to implement the disclosed architecture on multiple aircraft platforms without modification of the Flight Control Computer (FCC) and Backup Flight Control Unit (BFCU) hardware platforms.

A fifth advantage of the simplex Flight Control Computer (FCC) disclosed herein and the corresponding Flight Control System (FCS) architecture is the ability of the Flight Control Computer (FCC) to host different partitions which enables including autonomy and protection functions into the system without additional hardware and without affecting the design of the flight control functions.

Clauses:

Clause 1: A simplex Flight Control Computer (FCC) to be used in a flight control system comprising the simplex Flight Control Computer and at least one neighboring flight control computer (FCC), the simplex flight control computer comprising:
- an input providing module for receiving sensor data, system data as well as data generated by at least one given neighboring flight control computer of the at least one neighboring flight control computer;
- a processing unit for executing a command partition and a monitor partition, wherein the processing unit receives the sensor data, the system data and the data generated by each of the at least one given neighboring flight control computer from the input providing module; further wherein the monitor partition is used for monitoring the data generated by each of the at least one given neighboring flight control computer and for providing to each of the at least one neighboring flight control computer a signal indicative of said monitoring, and further wherein the command partition is used for generating command signals;
- a hardware monitoring module for providing a corresponding Flight Control Computer (FCC) validity signal indicative of a health of the flight control computer;
- an output cutoff module receiving each corresponding Flight Control Computer (FCC) validity signal from each of the at least one given neighboring flight control computer as well as enable signals generated by each monitor partition of each of the at least one given neighboring flight control computer; the output cutoff module providing an enable signal in accordance with a predetermined enabling strategy; and
- an enable switch operatively connected to the output cutoff module and to the processing unit and for providing a received signal originating from the command partition according to the enable signal.

Clause 2. The simplex Flight Control Computer (FCC) as claimed in clause 1, wherein the simplex flight control computer is operatively connected to at least two neighboring flight control computers (FCC), wherein:
- the input providing module receives sensor data, system data as well as data generated by each of the at least two neighboring flight control computers;
- further wherein the processing unit receives the sensor data, the system data and the data generated by each of the at least two neighboring flight control computers from the input providing module;
- further wherein the monitor partition is used for monitoring the data generated by each of the at least two neighboring flight control computers and for providing to each of the at least two neighboring flight control computers a signal indicative of said monitoring; and
- further wherein the output cutoff module receives each corresponding FCC validity signal from each of the at least two neighboring flight control computers as well as enable signals generated by each monitor partition of each of the at least two neighboring flight control computers.

Clause 3. The simplex Flight Control Computer (FCC) as claimed in any one of clauses 1 to 2, wherein the processing unit is a single processing lane with high integrity interlock.

Clause 4. The simplex Flight Control Computer (FCC) as claimed in any one of clauses 1 to 3, wherein the predetermined enabling strategy comprises providing a given enable signal to the enable switch to output a corresponding given received signal from the command partition when a validity signal from at least one given neighboring Flight Control Computer (FCC) is received as well as an enable signal by the monitor partition of the at least one given Flight Control Computer (FCC) or when each of the at least one neighboring flight control computer provides an invalid signal.

Clause 5. The simplex Flight Control Computer (FCC) as claimed in any one of clauses 1 to 4, wherein said command partition and said monitor partition are coded using a different coding language.

Clause 6. The simplex Flight Control Computer (FCC) as claimed in any one of clauses 1 to 5, further comprising a power supply module used for powering the simplex Flight Control Computer (FCC).

Clause 7. A Flight Control System (FCS) architecture for an aircraft, the Flight Control System (FCS) architecture comprising:
- a plurality of inceptors and interfacing systems;
- at least two of the simplex Flight Control Computer (FCC) as claimed in any one of clauses 1 to 6, each of the at least two simplex Flight Control Computer (FCC) being operatively connected to the plurality of inceptors and interfacing systems; and a Backup Flight Control Unit (BFCU) operatively connected to the plurality of inceptors and interfacing systems and to the at least two simplex Flight Control Computers (FCC); and a plurality of Motor Control and Motor Control Units (MC/MCU) used for controlling effectors of the aircraft wherein the plurality of Motor Control and Motor Control Units (MC/MCU) is operatively connected to the at least two simplex Flight Control Computers (FCC) and to the Backup Flight Control Unit (BFCU).

Clause 8. The Flight Control System (FCS) architecture as claimed in clause 7, wherein each of the at least one of plurality of Motor Control and Motor Control Units (MC/MCU) is used for controlling a corresponding effector of the aircraft.

Clause 9. The Flight Control System (FCS) architecture as claimed in any one of clauses 7 to 8, wherein the plurality of Motor Control and Motor Control Units (MC/MCU) are operatively connected to the at least two simplex Flight Control Computers (FCC) using a first fieldbus and the plurality of Motor Control and Motor Control Units (MC/MCU) are operatively connected to the Backup Flight Control Unit (BFCU) using a second fieldbus and further wherein the first fieldbus is dissimilar to the second fieldbus.

The invention claimed is:

1. A simplex Flight Control Computer (FCC) to be used in a flight control system comprising the simplex Flight Control Computer and at least one neighboring simplex flight control computer (FCC), the simplex flight control computer comprising:
   an input providing module for receiving sensor data, system data as well as data generated by at least one given neighboring simplex flight control computer of the at least one neighboring simplex flight control computer;
   a processing unit for executing a command partition and a monitor partition,
   wherein the processing unit receives the sensor data, the system data and the data generated by each of the at least one given neighboring simplex flight control computer from the input providing module;
   further wherein the monitor partition is used for monitoring the data generated by each of the at least one given neighboring simplex flight control computer and for providing to each of the at least one neighboring simplex flight control computer a signal indicative of said monitoring, and further wherein the command partition is used for generating command signals;
   a hardware monitoring module for providing a corresponding Flight Control Computer (FCC) validity signal indicative of a health of the simplex flight control computer;
   an output cutoff module receiving each corresponding Flight Control Computer (FCC) validity signal from each of the at least one given neighboring simplex flight control computer as well as enable signals generated by each monitor partition of each of the at least one given neighboring simplex flight control computer; the output cutoff module providing an enable signal in accordance with a predetermined enabling strategy;
   an enable switch operatively connected to the output cutoff module and to the processing unit and for providing a received signal originating from the command partition according to the enable signal; and
   wherein the predetermined enabling strategy comprises providing a given enable signal to the enable switch to output a corresponding given received signal from the command partition when a validity signal set to valid is received from at least one given neighboring simplex flight Control Computer (FCC) as well as an enable signal set to enable is received by the monitor partition of the at least one given neighboring simplex Flight Control Computer (FCC) or when each of the at least one neighboring simplex flight control computer provides the validity signal set to invalid.

2. The simplex Flight Control Computer (FCC) as claimed in claim 1, wherein the simplex flight control computer is operatively connected to at least two neighboring simplex flight control computers (FCC), wherein:
   the input providing module receives sensor data, system data as well as data generated by each of the at least two neighboring simplex flight control computers;
   further wherein the processing unit receives the sensor data, the system data and the data generated by each of the at least two neighboring simplex flight control computers from the input providing module;
   further wherein the monitor partition is used for monitoring the data generated by each of the at least two neighboring simplex flight control computers and for providing to each of the at least two neighboring simplex flight control computers a signal indicative of said monitoring; and
   further wherein the output cutoff module receives each corresponding FCC validity signal from each of the at least two neighboring simplex flight control computers as well as enable signals generated by each monitor partition of each of the at least two neighboring simplex flight control computers.

3. The simplex Flight Control Computer (FCC) as claimed in claim 1, wherein the processing unit is a single processing lane with high integrity interlock.

4. The simplex Flight Control Computer (FCC) as claimed in claim 1, wherein said command partition and said monitor partition are coded using a different coding language.

5. The simplex Flight Control Computer (FCC) as claimed in claim 1, further comprising a power supply module used for powering the simplex Flight Control Computer (FCC).

6. A Flight Control System (FCS) architecture for an aircraft, the Flight Control System (FCS) architecture comprising:
   a plurality of inceptors and interfacing systems;
   at least two of the simplex Flight Control Computer (FCC) as claimed in claim 1, each of the at least two simplex Flight Control Computer (FCC) being operatively connected to the plurality of inceptors and interfacing systems; and
   a Backup Flight Control Unit (BFCU) operatively connected to the plurality of inceptors and interfacing systems and to the at least two simplex Flight Control Computers (FCC); and
   a plurality of Motor Control and Motor Control Units (MC/MCU) used for controlling effectors of the aircraft wherein the plurality of Motor Control and Motor Control Units (MC/MCU) is operatively connected to the at least two simplex Flight Control Computers (FCC) and to the Backup Flight Control Unit (BFCU).

7. The Flight Control System (FCS) architecture as claimed in claim 6, wherein each of the at least one of plurality of Motor Control and Motor Control Units (MC/MCU) is used for controlling a corresponding effector of the aircraft.

8. The Flight Control System (FCS) architecture as claimed in claim 6, wherein the plurality of Motor Control and Motor Control Units (MC/MCU) are operatively connected to the at least two simplex Flight Control Computers (FCC) using a first fieldbus and the plurality of Motor Control and Motor Control Units (MC/MCU) are operatively connected to the Backup Flight Control Unit (BFCU) using a second fieldbus and further wherein the first fieldbus is dissimilar to the second fieldbus.

* * * * *